US012565977B2

(12) United States Patent
Choi

(10) Patent No.: US 12,565,977 B2
(45) Date of Patent: Mar. 3, 2026

(54) LAMP FOR VEHICLE

(71) Applicant: HYUNDAI MOBIS CO., LTD., Seoul (KR)

(72) Inventor: Kook Young Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/903,552

(22) Filed: Oct. 1, 2024

(65) Prior Publication Data

US 2025/0354673 A1 Nov. 20, 2025

(51) Int. Cl.
| | |
|---|---|
| *F21S 43/239* | (2018.01) |
| *F21S 43/235* | (2018.01) |
| *F21S 43/237* | (2018.01) |
| *F21S 43/241* | (2018.01) |
| *F21S 43/245* | (2018.01) |
| *F21V 8/00* | (2006.01) |

(52) U.S. Cl.
CPC ........... *F21S 43/239* (2018.01); *F21S 43/235* (2018.01); *F21S 43/237* (2018.01); *F21S 43/241* (2018.01); *F21S 43/245* (2018.01); *G02B 6/0036* (2013.01); *G02B 6/0038* (2013.01)

(58) Field of Classification Search
CPC ...... F21S 43/239; F21S 43/245; F21S 43/235; F21S 43/237; F21S 43/241; G02B 6/0036; G02B 3/0038; G02B 6/0038
USPC ........................................................ 362/511
See application file for complete search history.

(56) References Cited

U.S. PATENT DOCUMENTS

| | | | | |
|---|---|---|---|---|
| 8,333,493 B2 * | 12/2012 | Taleb-Bendiab | ..... | G02B 6/0045 362/555 |
| 2006/0139950 A1 * | 6/2006 | Maeda | ................. | G02B 6/0028 362/610 |
| 2008/0232127 A1 * | 9/2008 | Futami | ................. | G02B 6/0038 362/511 |
| 2017/0234501 A1 * | 8/2017 | Hanami | ................ | F21S 43/245 362/511 |

FOREIGN PATENT DOCUMENTS

| | | |
|---|---|---|
| EP | 1 857 732 A1 | 11/2007 |
| EP | 2 543 540 A1 | 1/2013 |

(Continued)

OTHER PUBLICATIONS

Extended European Search Report Issued on Feb. 25, 2025, in Counterpart European Patent Application No. 24207094.4 (10 Pages in English).

*Primary Examiner* — Laura K Tso

(74) *Attorney, Agent, or Firm* — NSIP Law

(57) ABSTRACT

A lamp for a vehicle including a light source part to emit light and a light guide part to receive light emitted from the light source part and to output the light from a front side of the light guide part. The light guide part includes: a guide body including an input surface disposed at an end of the guide body in an extension direction of the light guide part to which the light emitted from the light source part is input; a reflective surface formed on a rear surface of the guide body, and having a reflective optic part configured to reflect the light input through the input surface to the front side of the light guide part; and an output surface to output the light to an outer surface of the guide body. The reflective optic part includes a plurality of first reflective optics and second reflective optics.

10 Claims, 21 Drawing Sheets

(56) References Cited

FOREIGN PATENT DOCUMENTS

| | | | |
|---|---|---|---|
| JP | 2018-113133 A | 7/2018 | |
| KR | 10-2020-0036334 A | 4/2020 | |
| KR | 10-2024-0034534 A | 3/2024 | |
| WO | WO-2013008215 A1 * | 1/2013 | ........... B60Q 1/0052 |

* cited by examiner

100

100

LAMP FOR VEHICLE

CROSS-REFERENCE TO RELATED APPLICATION

This application claims the benefit of priority to Korean Patent Application No. 10-2024-0065342, filed in the Korean Intellectual Property Office on May 20, 2024, the entire contents of which are incorporated herein by reference.

TECHNICAL FIELD

The present disclosure relates to a lamp for a vehicle.

BACKGROUND

Recently, vehicle lamps have been developed in various forms to enhance the aesthetics of external appearances of the vehicles in accordance with the needs of users who value design. In particular, recently, light guides that produce an indirect lighting effect by reflecting light that is received from a light source without directly exposing a light source have been widely applied to vehicles. The light guide may guide the input light to a front side by using optics formed on a rear side.

However, because the optics of a conventional light guide are formed in a form that repeats the same shape and are formed only on a reflective surface on a rear side of the light guide, hotspots and dark areas occur when the lamp is turned on, resulting in an uneven lighting image. In particular, in light guides that are freely curved for aesthetics, it is difficult to create a uniform lighting image by using only the optics formed on the rear side.

Accordingly, there is a need to develop a light guide that may improve both light distribution performance and lighting uniformity while securing design freedom.

SUMMARY

The present disclosure has been made to solve the above-mentioned problems occurring in the prior art while advantages achieved by the prior art are maintained intact.

An aspect of the present disclosure provides a lamp for a vehicle that improves a light distribution performance and also maximizes a uniformity of a lighting image.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part configured to emit light; and a light guide part configured to receive light emitted from the light source part and to guide and output the light received from the light source part from a front side of the light guide part. The light guide part includes: a guide body including an input surface disposed at a first end of the guide body in an extension direction of the light guide part and to which the light emitted from the light source part is input; a reflective surface formed on a rear surface of the guide body, and having a reflective optic part configured to reflect the light input through the input surface to the front side of the light guide part; and an output surface configured to output the light to an outer surface of the guide body. The reflective optic part includes: a plurality of first reflective optics configured to reflect at least a portion of the input light to the front side of the light guide part; and second reflective optics configured to reflect at least a portion of the input light to the front side of the light guide part, formed in a different shape from that of the first reflective optics, and disposed between the plurality of first reflective optics.

Each of the first reflective optics and the second reflective optics may be concave toward the front side of the light guide part on the reflective surface, and may extend in a direction perpendicular to the extension direction of the light guide part, a cross-sectional shape of the first reflective optic in a direction perpendicular to an extension direction of the first reflective optic may be in a partial shape of a circle, and a cross-sectional shape of the second reflective optic in an extension direction of the second reflective optic may be in a shape including a first inclined line and a second inclined line crossing the first inclined line at a front end thereof.

An angle defined by the reflective surface and the first inclined line and an angle defined by the reflective surface and the second inclined line may be different.

The reflective optic part may be configured such that the first reflective optics and the second reflective optics are alternately disposed along the extension direction of the light guide part.

The reflective optic part may be on the reflective surface in two stages in a direction crossing the extension direction of the light guide part, and when any one of the reflective optic part in the two stages is a first stage reflective optic part and the other thereof is a second stage reflective optic part, the second reflective optic in the second stage reflective optic part may be disposed at a location corresponding to the first reflective optic provided in the first stage reflective optic part, and the first reflective optic in the second stage reflective optic part may be disposed at a location corresponding to the second reflective optic provided in the first stage reflective optic part.

The first stage reflective optic part and the second stage reflective optic part may be spaced apart from each other.

The guide body may include a first part extending to be inclined to the front side of the light guide part as it extends with respect to the extension direction of the light guide part; a curved part connected to an end of the first part; and a second part extending from the curved part, and extending to be inclined to a rear side of the light guide part, which is opposite the of the front side of the light guide part. The curved part may include a plurality of optics formed to be concave toward the rear side of the light guide part.

The output surface of the light guide part may have a partial shape of a cylindrical pipe, and when, on an imaginary plane including a central axis of the first part and a central axis of the second part, a radius of curvature of the curved part is defined as a curved part curvature radius, and when, on a cross-section in a direction perpendicular to a central axis of the guide body, twice of the radius of curvature of the output surface is defined as an output surface diameter, the curved part curvature radius may be one to five times or less the output surface diameter.

The reflective optic part may be disposed on the output surface to extend in a direction perpendicular to an extension direction of the guide body, and the first and second reflective optics may be spaced apart from each other along the extension direction of the guide body.

The guide body may further include a third part extending from the second part, and extending in a direction perpendicular to a direction facing the front side of the light guide part, the reflective optic part disposed in the first part may include the first reflective optics, and the reflective optic parts disposed in the second part and the third part, respectively, may include the first reflective optics and the second reflective optics alternately disposed along the extension direction of the light guide part.

BRIEF DESCRIPTION OF THE DRAWINGS

The above and other objects, features and advantages of the present disclosure will be more apparent from the following detailed description taken in conjunction with the accompanying drawings:

FIG. 16B is an isoluminance curve (a top view), a lighting image (a middle view) when viewed from a front side of a lamp when the lamp is turned on, and a lighting image (a bottom view) when viewed from a lateral side of the lamp when the lamp is turned on;

FIG. 17B is an isoluminance curve (a top view), a lighting image (a middle view) when viewed from a front side of the lamp when the lamp is turned on, a lighting image (a bottom view) when viewed from a lateral side of the lamp when the lamp is turned on.

FIG. 18B is an isoluminance curve (a top view), a lighting image (a middle view) when viewed from a front side of the lamp when the lamp is turned on, a lighting image (a bottom view) when viewed from a lateral side of the lamp when the lamp is turned on.

DETAILED DESCRIPTION

Hereinafter, embodiments of the present disclosure will be described in detail according to the attached drawings.

First, the embodiments described below are suitable for helping understanding the technical features of a lamp for a vehicle according to the present disclosure. However, the present disclosure is not limited to the embodiments described below or the technical features of the present disclosure are not limited by the described embodiments, and various modifications are possible within the technical scope of the present disclosure.

Figure 1:
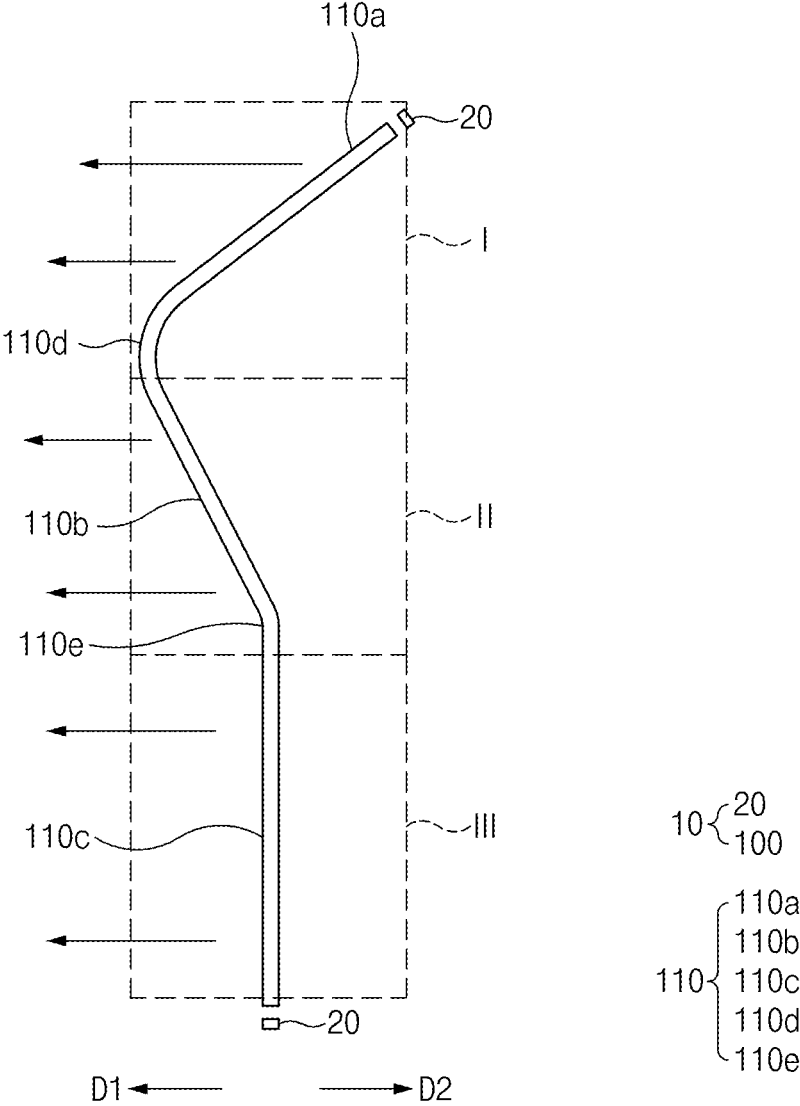
FIG. 1 is a side view illustrating a lamp for a vehicle according to a first embodiment of the present disclosure.
Figure 2:
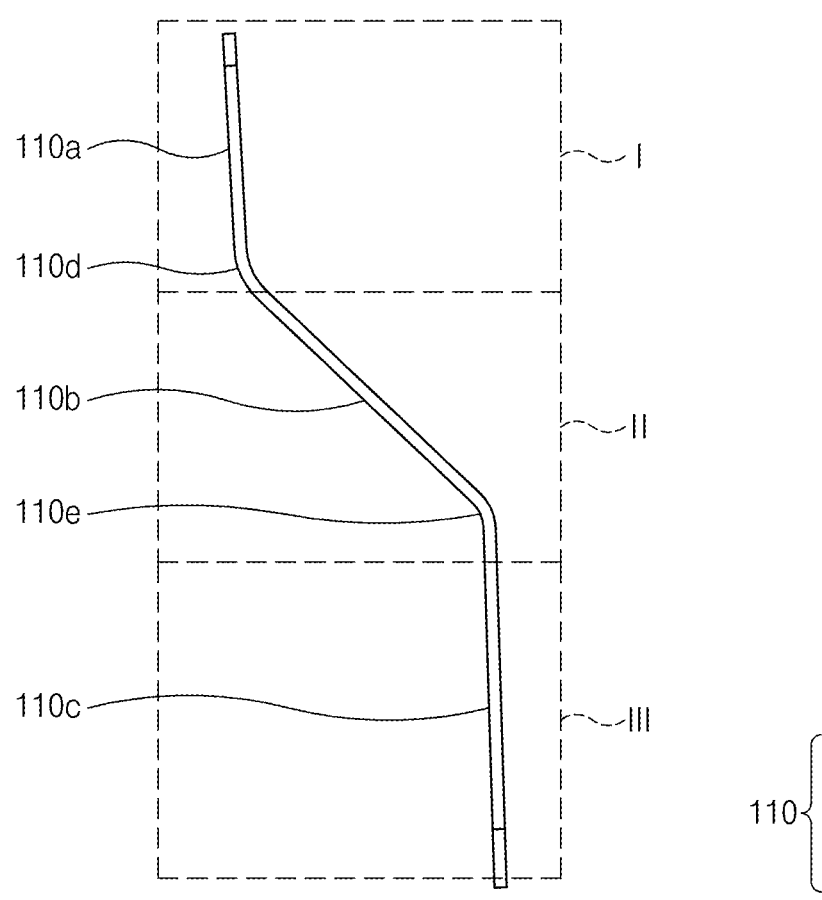
FIG. 2 illustrates a lamp for a vehicle according to a first embodiment of the present disclosure, and is a front view of a light guide part when viewed from a front side.
Figure 3:
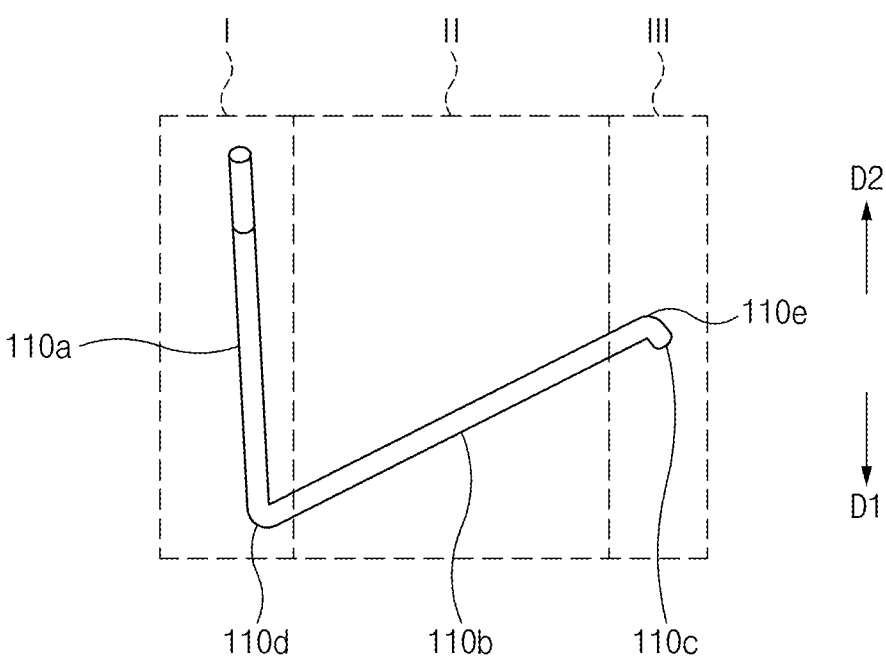
FIG. 3 illustrates a lamp for a vehicle according to the first embodiment of the present disclosure, and is a top view of light guide part when viewed from a top.
Figure 4:
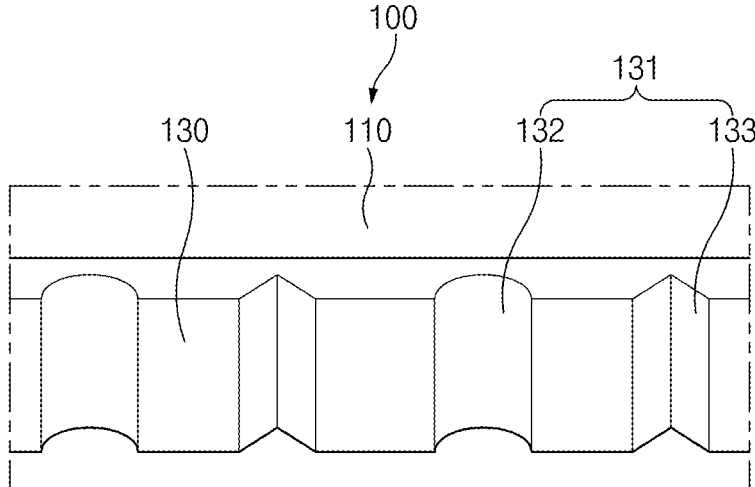
FIG. 4 is a partially enlarged perspective view of a portion of a light guide part according to the first embodiment of the present disclosure, when viewed from a rear side.
Figure 5:
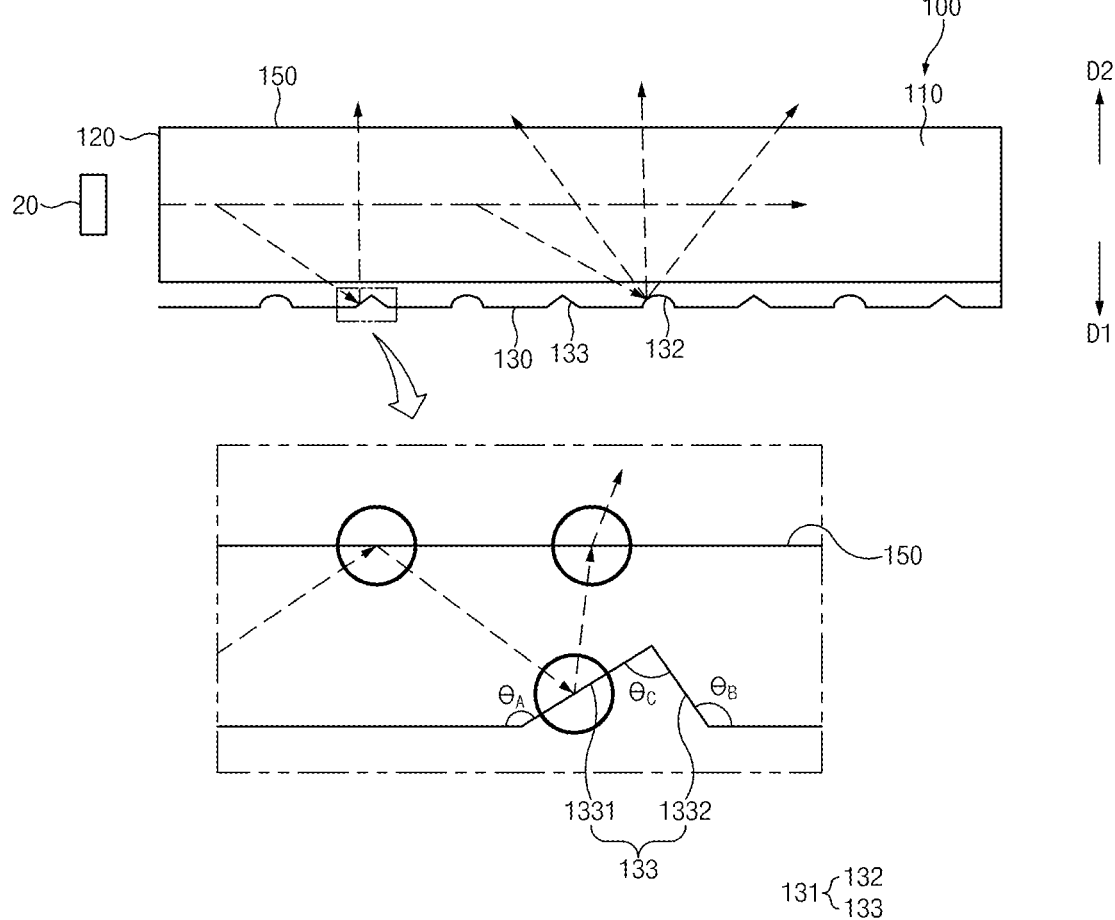
FIG. 5 is a side view of a light guide part according to the first embodiment of the present disclosure, and an enlarged view thereof.
Figure 6:
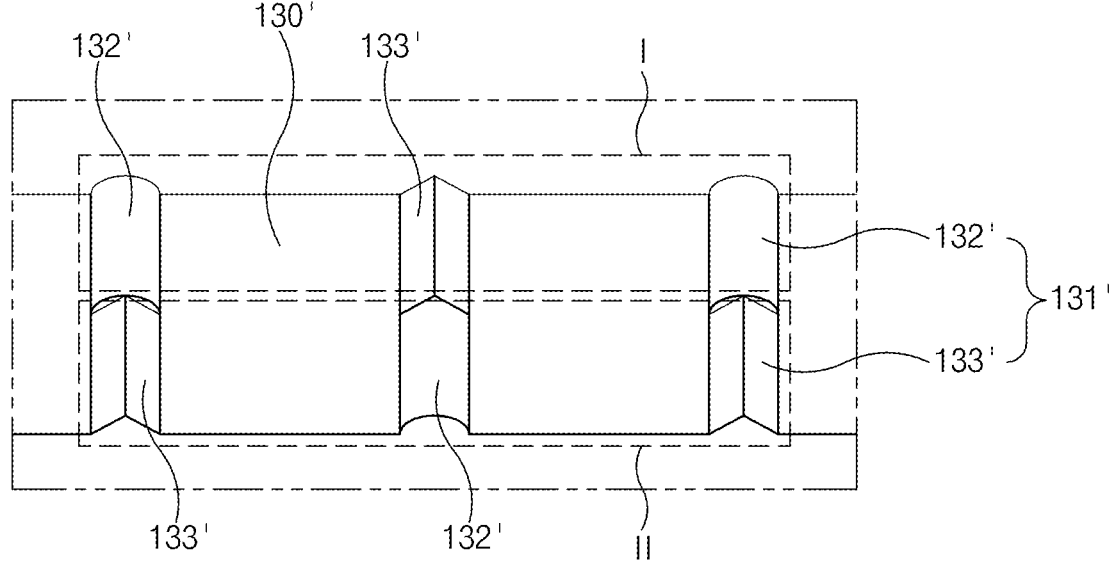
FIG. 6 is a partially enlarged perspective view of a portion of a light guide part according to a second embodiment of the present disclosure, when viewed from a rear side.
Figure 7:
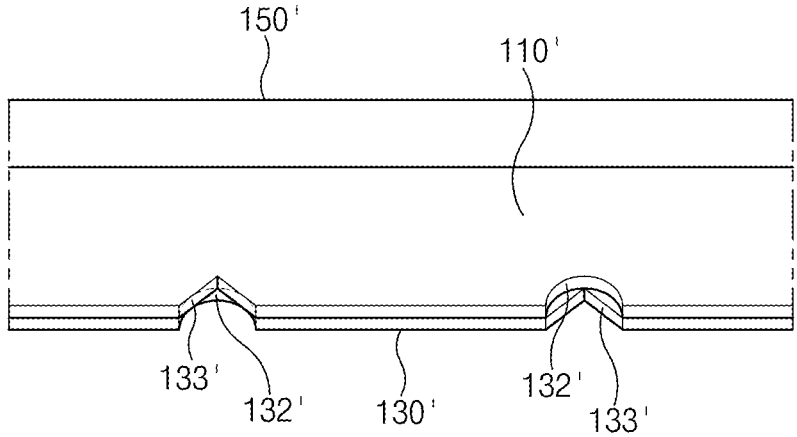
FIG. 7 illustrates a light guide part according to the second embodiment of the present disclosure, and is a part of a side view of the light guide part of FIG. 6, when viewed from a lateral side.
Figure 8:
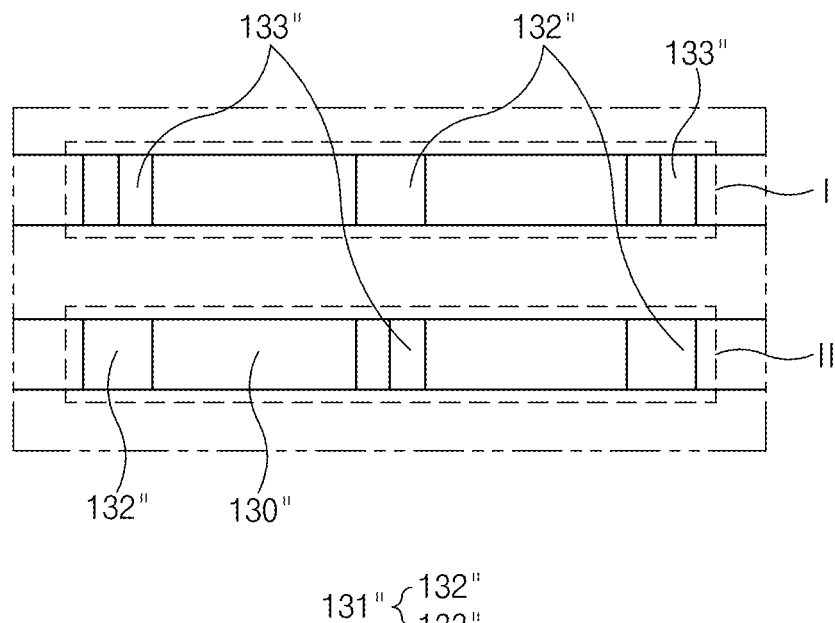
FIG. 8 is a rear view illustrating a reflective surface of a light guide part according to a modification of the second embodiment of the present disclosure.

FIG. 1 is a side view illustrating a lamp for a vehicle according to a first embodiment of the present disclosure, FIG. 2 illustrates the lamp for a vehicle according to the first embodiment of the present disclosure, and is a front view of a light guide part when viewed from a front side, FIG. 3 illustrates the lamp for a vehicle according to the first embodiment of the present disclosure, and is a top view of the light guide part when viewed from a top, FIG. 4 is a partially enlarged perspective view of a portion of the light guide part according to the first embodiment of the present disclosure, when viewed from a rear side, and FIG. 5 is a side view of the light guide part according to the first embodiment of the present disclosure, and an enlarged view thereof. FIG. 6 is a partially enlarged perspective view of a portion of a light guide part according to a second embodiment of the present disclosure, when viewed from a rear side, FIG. 7 illustrates a light guide part according to the second embodiment of the present disclosure, and is a part of a side view of the light guide part of FIG. 6, when viewed from a lateral side, and FIG. 8 is a rear view illustrating a reflective surface of a light guide part according to a modification of the second embodiment of the present disclosure.

Figure 9:
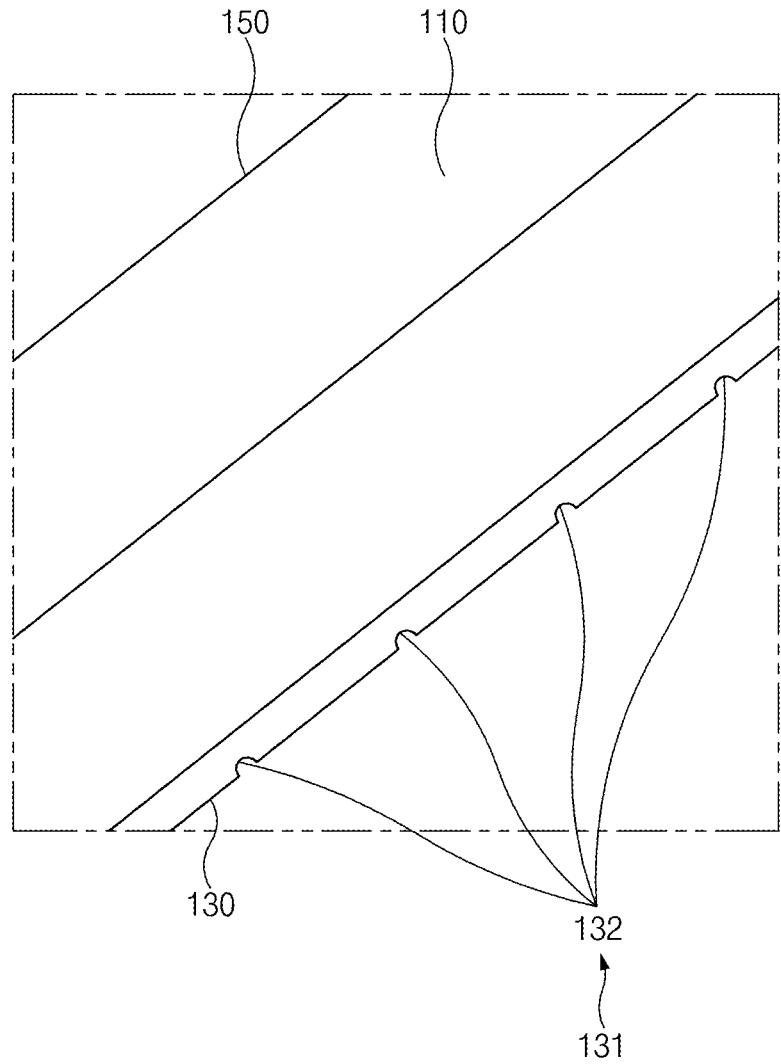
FIG. 9 is a side view illustrating a portion of a first part of a light guide part according to an embodiment of the present disclosure.
Figure 10:
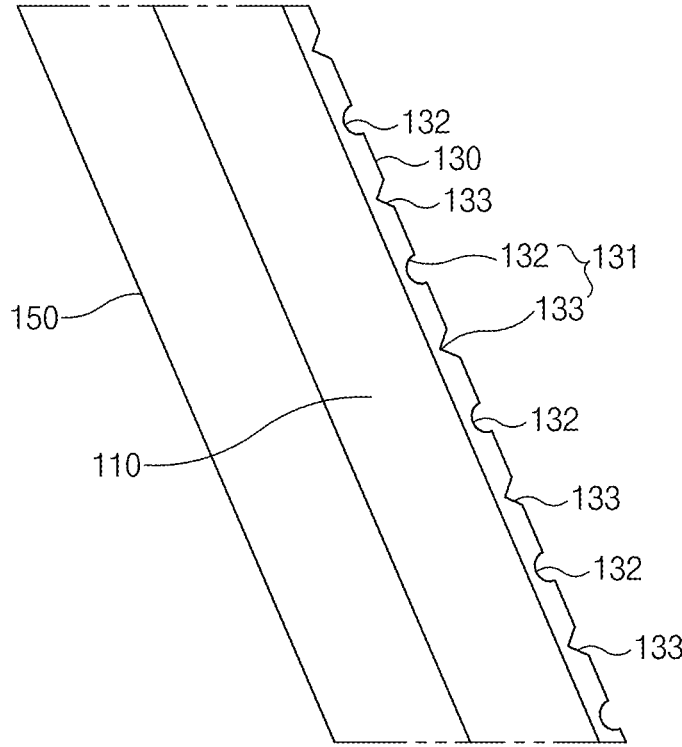
FIG. 10 is a side view illustrating a portion of a second part of a light guide part according to an embodiment of the present disclosure.
Figure 11:
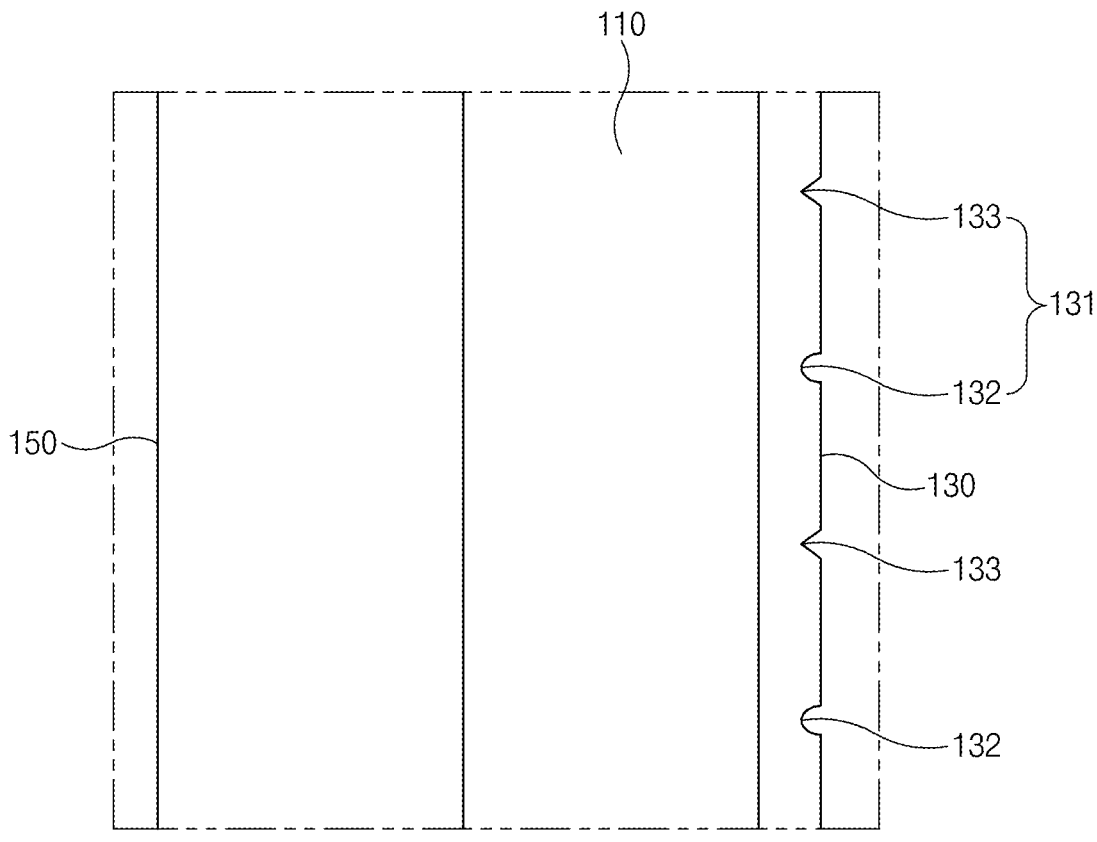
FIG. 11 is a side view illustrating a portion of a third part of a light guide part according to an embodiment of the present disclosure.
Figure 12:
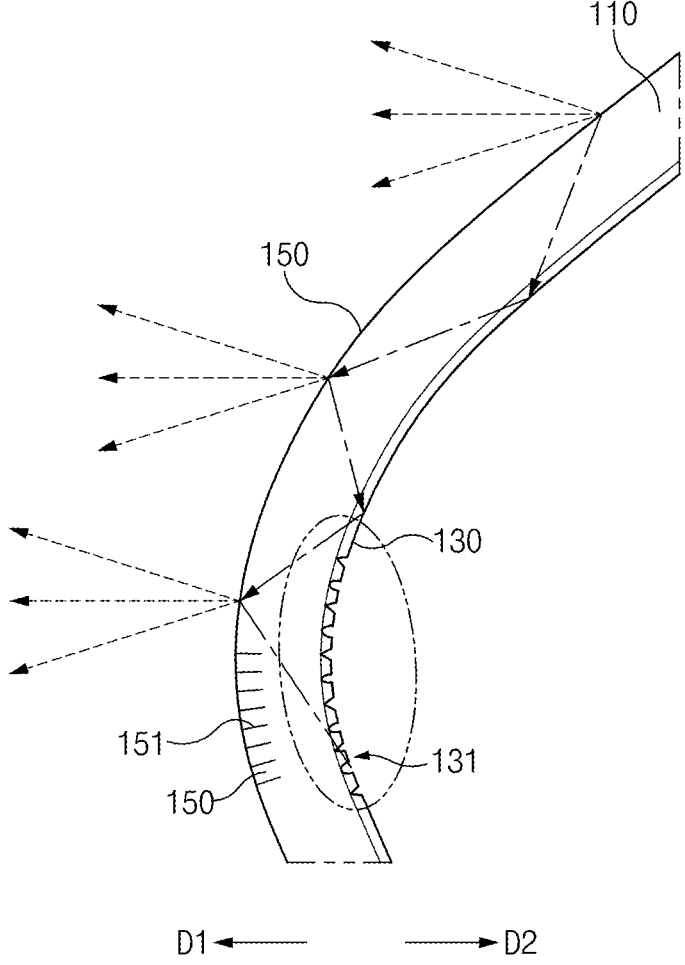
FIG. 12 is a side view illustrating a portion of a light guide part according to an embodiment of the present disclosure, and is a view illustrating a first part, a curved part, and a light path.
Figure 13:
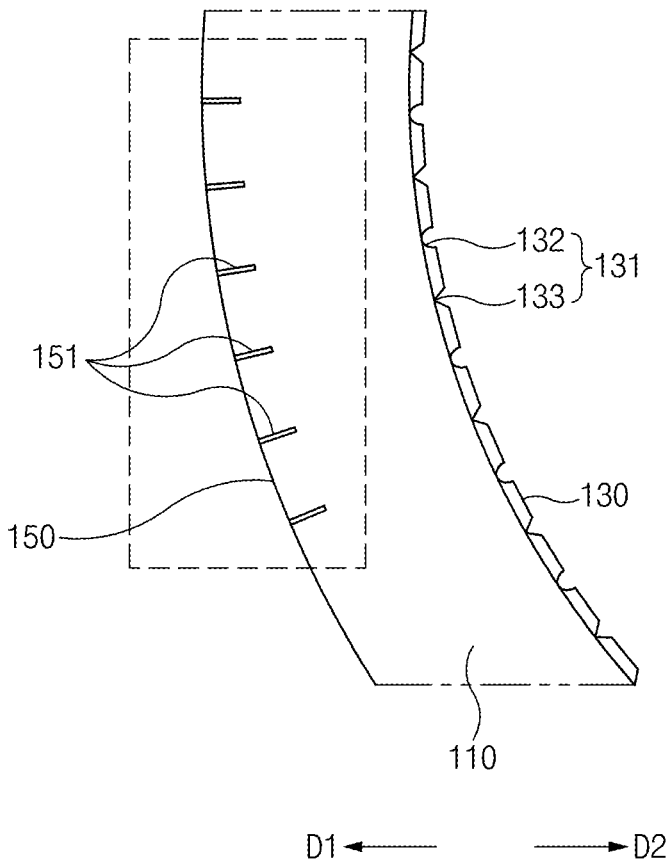
FIG. 13 is a side view illustrating a portion of a light guide part according to an embodiment of the present disclosure, and is a view illustrating an optic.
Figure 14:
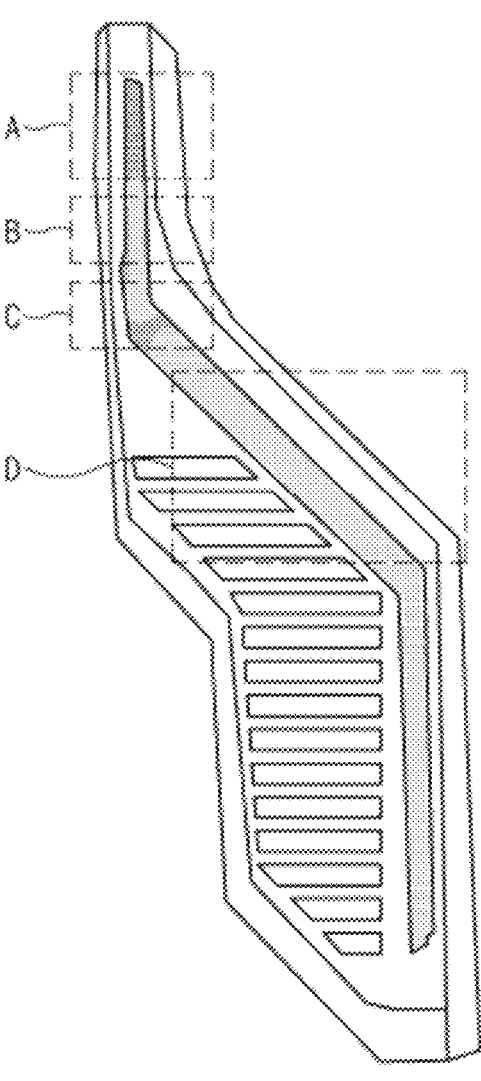
FIG. 14 illustrates a lighting image of a lamp for a vehicle according to a comparative example of the present disclosure.
Figure 15:
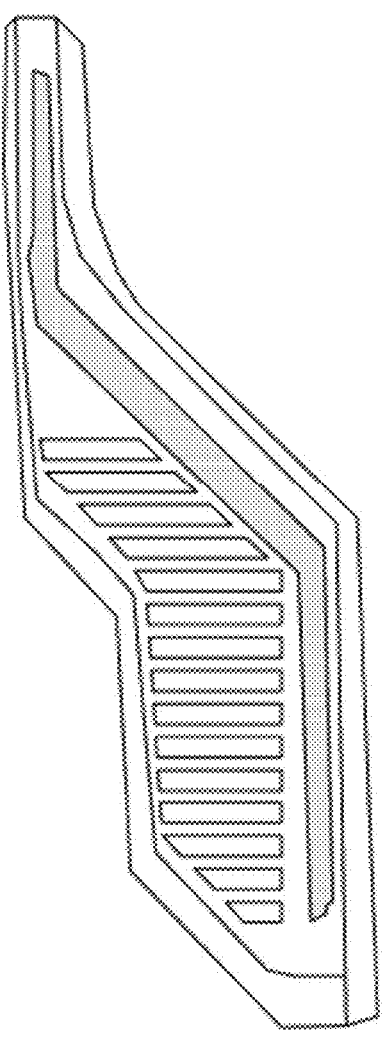
FIG. 15 illustrates a lighting image of a lamp for a vehicle according to an embodiment of the present disclosure.
Figure 16A:
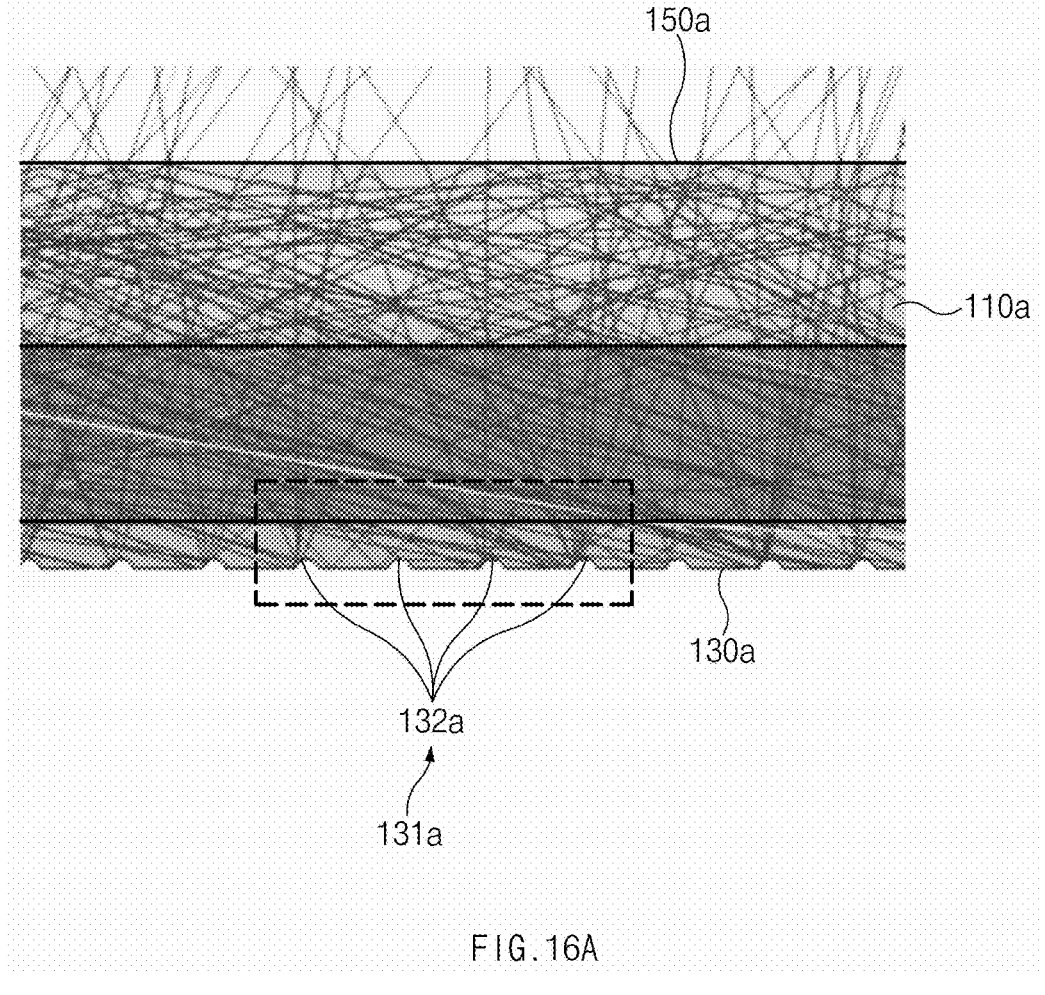
FIG. 16A is a side view illustrating a light guide part according to a comparative example of the present disclosure.
Figure 16B:
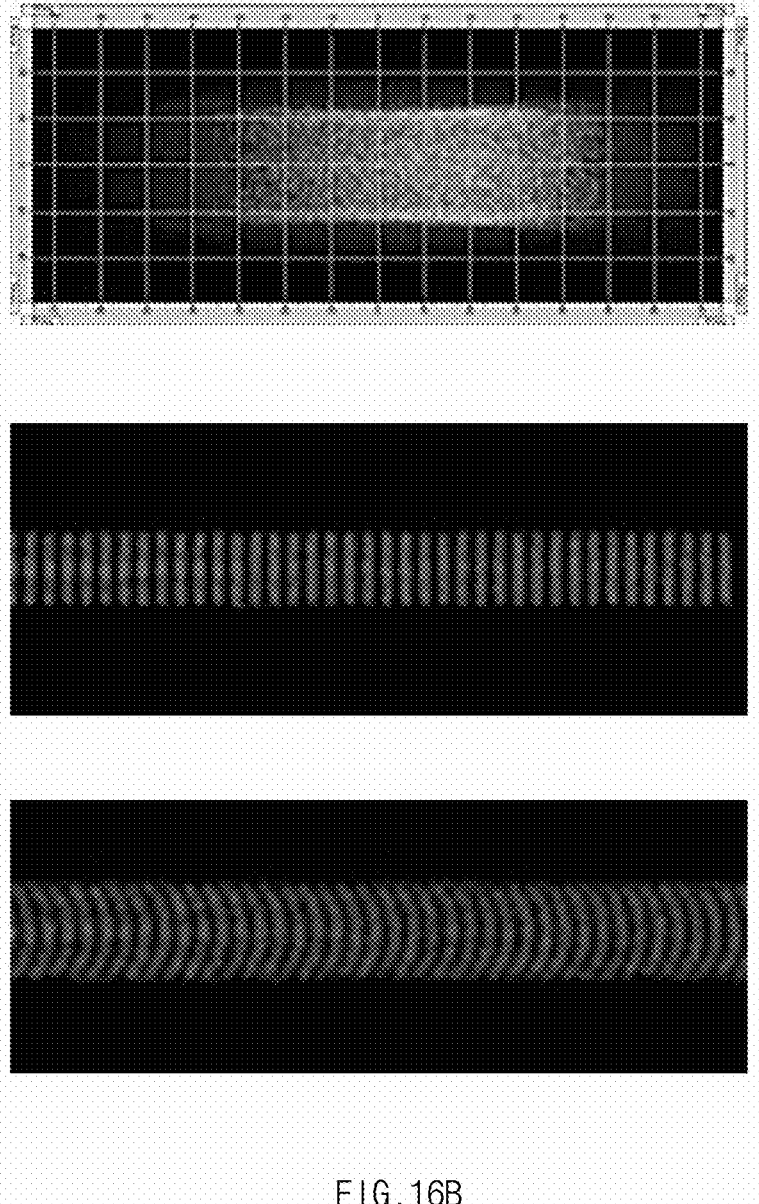
Figure 17A:
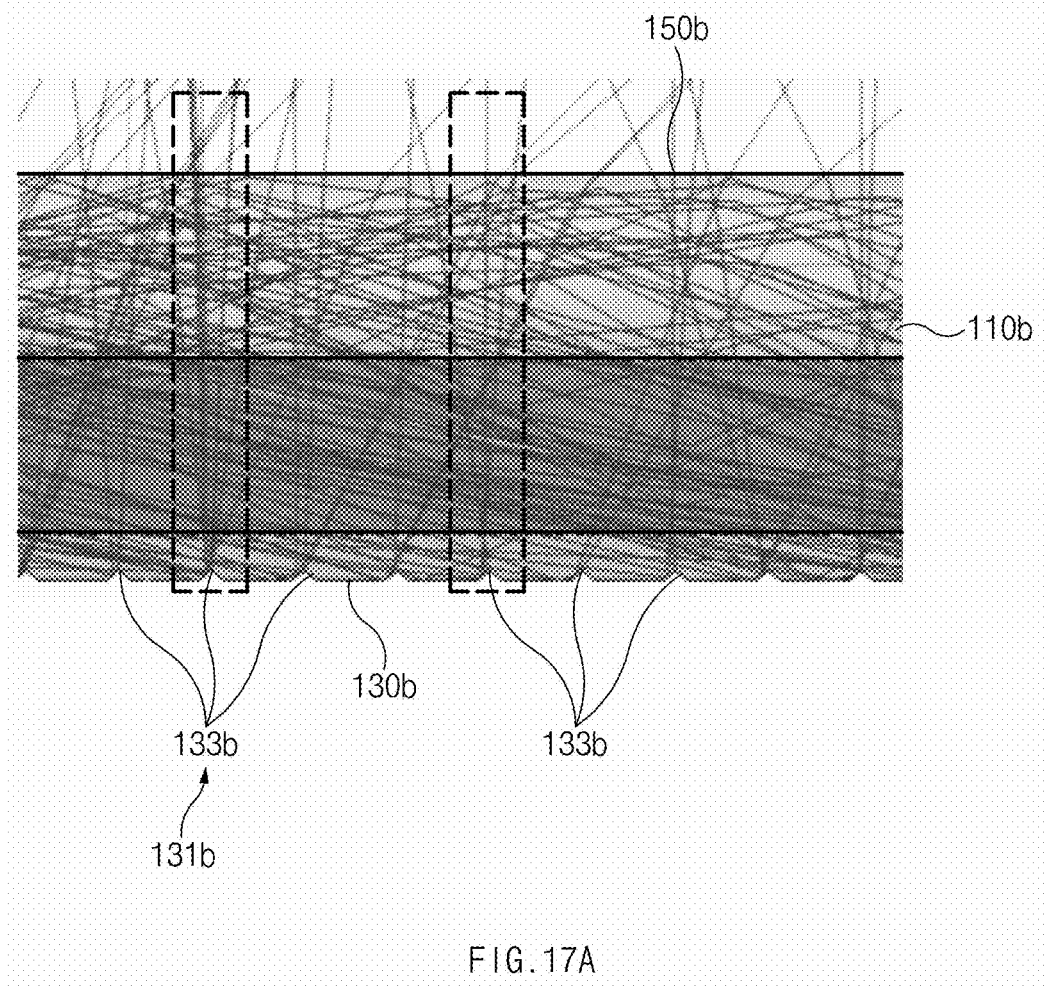
FIG. 17A is a side view illustrating a light guide part according to a comparative example of the present disclosure.
Figure 17B:
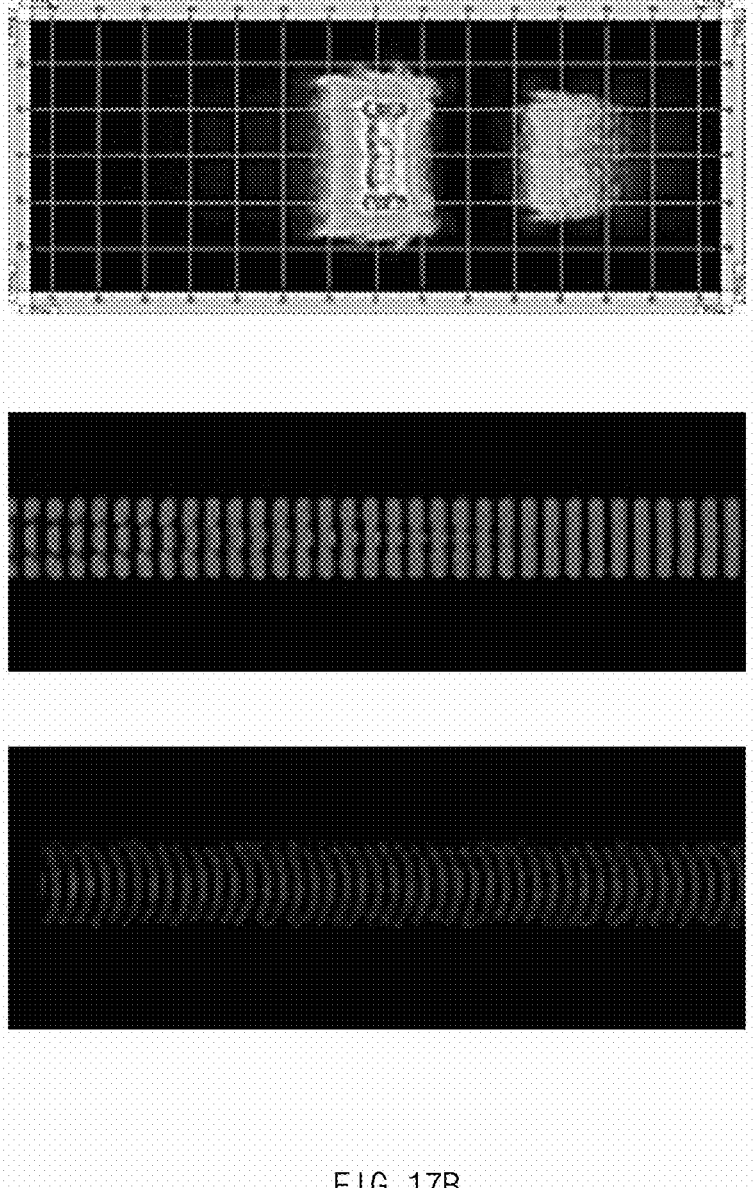
Figure 18A:
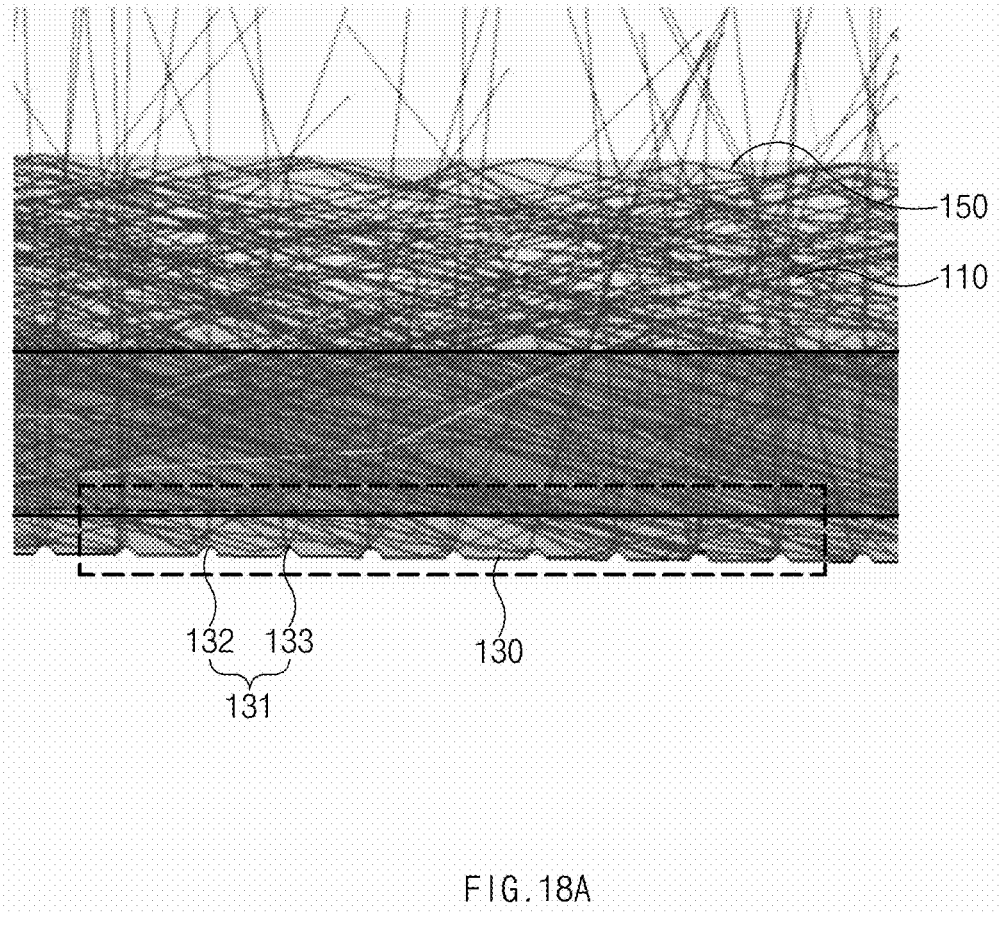
FIG. 18A is a side view illustrating a light guide part according to an embodiment of the present disclosure.
Figure 18B:
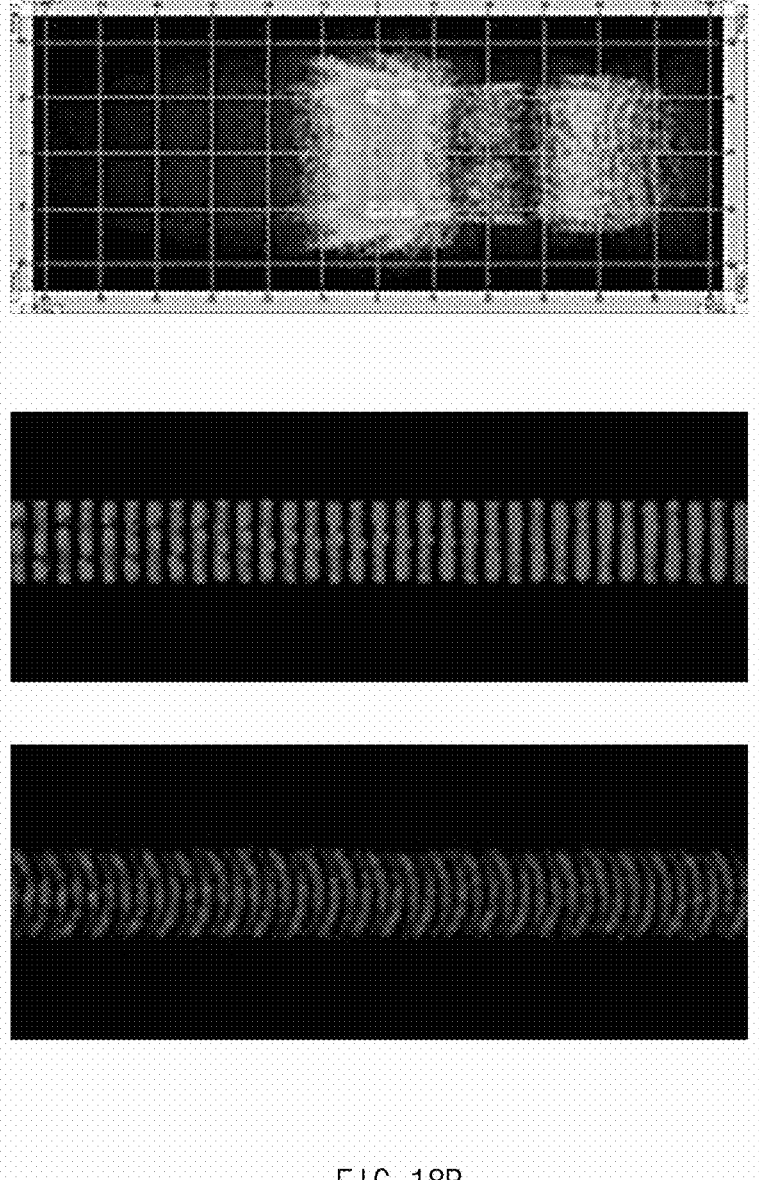

FIG. 9 is a side view illustrating a portion of a first part of the light guide part according to an embodiment of the present disclosure, and FIG. 10 is a side view illustrating a portion of a second part of the light guide part according to an embodiment of the present disclosure. FIG. 11 is a side view illustrating a portion of a third part of the light guide part according to an embodiment of the present disclosure, FIG. 12 is a side view illustrating a portion of the light guide part according to an embodiment of the present disclosure, and is a view illustrating a first part, a curved part, and a light path, FIG. 13 is a side view illustrating a portion of the light guide part according to an embodiment of the present disclosure, and is a view illustrating an optic, FIG. 14 illustrates a lighting image of a lamp for a vehicle according to a comparative example of the present disclosure, and FIG. 15 illustrates a lighting image of a lamp for a vehicle according to an embodiment of the present disclosure, FIG. 16A is a side view illustrating a light guide part according to a comparative example of the present disclosure, and FIG. 16B is an isoluminance curve (a top view), a lighting image (a middle view) when viewed from a front side of a lamp when the lamp is turned on, and a lighting image (a bottom view) when viewed from a lateral side of the lamp when the lamp is turned on, FIG. 17A is a side view illustrating a light guide part according to a comparative example of the present disclosure, and FIG. 17B is an isoluminance curve (a top view), a lighting image (a middle view) when viewed from a front side of the lamp when the lamp is turned on, a lighting image (a bottom view) when viewed from a lateral side of the lamp when the lamp is turned on, and FIG. 18A is a side view illustrating a light guide part according to an embodiment of the present disclosure, and FIG. 18B is an isoluminance curve (a top view), a lighting image (a middle view) when viewed from a front side of the lamp when the lamp is turned on, a lighting image (a bottom view) when viewed from a lateral side of the lamp when the lamp is turned on.

Referring to FIGS. 1 to 13, 15, 18A, and 18B, a lamp 10 for a vehicle according to an embodiment of the present disclosure includes a light source part 20 and a light guide part 100.

The light source part 20 generates and emits light.

In detail, the light source part 20 may use various elements or devices capable of emitting light. The light source part 20 may include a light source that generates light, and the light source, for example, may be a light emitting diode (LED).

The light guide part 100 is configured to guide and output the light that is input from the light source part 20. In detail, the light guide part 100 may be configured to guide the light input from the light source part 20 through total reflection or to output the light to a front side D1.

Here, an extension direction of the light guide part 100 may have various shapes depending on a design of the lamp 10 for a vehicle or the vehicle. For example, as in the illustrated embodiment, it may extend to have one or more curved parts, and in this case, the extension direction of the light guide part 100 may be changed. In the specification, a direction, in which the light guide part 100 extends, is defined as the extension direction of the light guide part 100.

Furthermore, in the specification, for convenience of description, a direction, in which light is emitted from the light guide part 100, is defined as the front side D1, and an opposite direction to the front side D1 is defined as a rear side D2.

The light guide part 100 includes a guide body 110, an input surface 120, a reflective surface 130, and an output surface 150.

The guide body 110 defines a body of the light guide part 100, and the light irradiated from the light source part 20 may be input thereto. The input surface 120, the reflective surface 130, and the output surface 150 may be surfaces that are formed on an outer surface of the guide body 110.

The input surface 120 is formed on at least one of one end and an opposite end of the extension direction of the guide body 110, and the light may be input thereto. The light input from the light source part 20 may be guided in an interior of the guide body 110 through total reflection or the like.

The reflective surface 130 is formed on the rear side D2 of the guide body 110 and a reflective optic part 131 that reflects the light input through the input surface 120 to the front side D1 may be formed.

The output surface 150 may be a surface other than the input surface 120 and the reflective surface 130, among the outer surfaces of the guide body 110, and may be a surface that is configured to output light. Here, the output surface 150 is a surface of the guide body 110 on the front side D1, and a direction which the output surface 150 faces, and the front side D1 may not coincide with each other. That is, when the light output from the output surface 150 may be output to the front side D1, there is no limit in the direction which the output surface 150 faces.

Referring to the illustrated embodiment in detail, the light that travels in an interior of guide body 110 may reach the reflective surface 130, be reflected, and then be output through the output surface 150. The reflective surface 130 may be formed a surface of the guide body 110 on the rear side D2. Here, a direction (a direction that is perpendicular to the reflective surface 130) which the reflective surface 130 faces and the rear side D2 do not necessarily coincide with each other. This is because, depending on the design of the lamp 10 for a vehicle, a design of the light guide part 100 may be formed in a shape including one or more curved parts rather than a rod shape.

The reflective optic part 131 provided on the reflective surface 130 includes a first reflective optic 132 and a second reflective optic 133.

The first reflective optic 132 may be formed to reflect at least a portion of the input light to the front side D1, and may be provided in plural numbers. Furthermore, the second reflective optic 133 may be configured to reflect at least a portion of the input light to the front side D1, and may be provided in plural numbers.

Furthermore, the second reflective optic 133 may be formed in a different shape from the first reflective optic 132 and may be disposed between the plurality of first reflective optics 132.

For example, as in the embodiment illustrated in FIGS. 4 to 8, each of the first reflective optic 132 and the second reflective optic 133 may be formed to be concave toward the front side D1 on the reflective surface 130, and may be formed to extend in a direction that is perpendicular to the extension direction of the light guide part 100.

Furthermore, for example, a cross-sectional shape of the first reflective optic 132 may have a partial shape of a circle in a direction that is perpendicular to an extension direction of the first reflective optic 132. In more detail, the first reflective optic 132 may be an arc-shaped groove, a cross-sectional shape of which is arc-shaped.

The first reflective optic 132 having an arc-shaped groove shape may be advantageous for light diffusion. In detail, the light that reaches the first reflective optic 132 may be diffused over a wide range and be totally reflected. Accordingly, the first reflective optic 132 may make the lighting image of the lamp 10 for a vehicle uniform, but has a low luminance.

Furthermore, for example, a cross-sectional shape of the second reflective optic 133 in a direction that is perpendicular to an extension direction of the second reflective optic 133 may be formed in a shape including a first inclined line 1331, and a second inclined line 1332 that meets the first inclined line 1331 at an end thereof on the front side D1. In detail, the cross-sectional shape of the second reflective optic 133 may be formed in a shape including a vertex that is formed when the first inclined line 1331 and the second inclined line 1332 meet each other. In other words, the second reflective optic 133 may be an angular groove including a first inclined surface including the first inclined line 1331, a second inclined surface including the second inclined line 1332, and a corner, at which the first inclined surface and the second inclined surface meet each other while defining an angle.

The second reflective optic 133 having the angular groove shape may reflect a high intensity light intensively in a desired direction. In detail, the light that reaches the second reflective optic 133 may be output while focusing strong light in a specific direction. Accordingly, the second reflective optic 133 may intensively reflect high intensity light, but the light uniformity of the lighting image is decreased and the lighting image has a significant difference depending on a viewing angle.

As a comparative example of the present disclosure, FIG. 16A illustrates an optical path when the reflective optic part 131*a* of the reflective surface 130*a* of the light guide part includes only the first reflective optic 132*a* having an arc-shaped groove shape. Furthermore, in FIG. 16B, an isoluminance curve (a top view), a lighting image (a middle viewed) viewed from the front side D1 of the lamp when the lamp is turned on, and a lighting image (a bottom view) viewed from a lateral side when the lamp is turned on are illustrated. As in the illustrated comparative example, the light totally reflected by the first reflective optic 132*a* is diffused in a wide direction to make the lighting image uniform, while the brightness of the light may be low. The undescribed reference numeral 110*a* denotes the guide body, and 150*a* denotes the output surface.

As a comparative example of the present disclosure, FIG. 17A illustrates an optical path when the reflective optic part 131*b* of the reflective surface 130*b* of the light guide part includes only the second reflective optic 133*b* having an angular groove shape. Furthermore, in FIG. 17B, an isoluminance curve (a top view), a lighting image (a middle viewed) viewed from the front side D1 of the lamp when the lamp is turned on, and a lighting image (a bottom view) viewed from a lateral side when the lamp is turned on are illustrated. As in the illustrated comparative example, the light totally reflected by the second reflective optic 133*b* is intensively totally reflected at a center of each of the second reflective optics 133*b* to produce strong light in a central field of view, while the lighting image may be uneven. The undescribed reference numeral 110*b* denotes the guide body, and 150*b* denotes the output surface.

FIG. 18A illustrates an embodiment of the present disclosure, and a light path when the reflective optic part 131 of the reflective surface 130 of the light guide part is complexly applied to the first reflective optic 132 having an arc-shaped groove shape, and a second reflective optic having an angular groove shape is illustrated. Furthermore, in FIG. 18B, an isoluminance curve (a top view), a lighting image (a middle viewed) viewed from the front side D1 of the lamp when the lamp is turned on, and a lighting image (a bottom view) viewed from a lateral side when the lamp is turned on are illustrated.

As in the illustrated embodiment, when the arc-shaped first reflective optic 132 and the angular second reflective optic 133 are alternately disposed and complexly applied, it may be identified that light of appropriate intensity is evenly distributed and totally reflected. Accordingly, the light totally reflected by the reflective optic part 131 may be diffused over a wide range to ensure the uniformity of the lighting image, and at the same time, the brightness may be increased to improve the light distribution performance.

According to the present disclosure, the light distribution performance may be improved and the uniformity of the lighting image in all directions may be maximized by alternately disposing the reflective optics of different shapes on the reflective surface 130 of the light guide part 100.

Meanwhile, referring to the enlarged view of the second reflective optic 133 illustrated in FIG. 5, an angle $\theta_A$ defined by the reflective surface 130 and the first inclined line 1331, and an angle $\theta_B$ defined by the reflective surface 130 and the second inclined line 1331 may be formed differently. Here, $\theta_C$ is an angle, at which the first inclined line 1331 and the second inclined line 1332 meet each other.

In detail, the first inclined line 1331 is an inclined line in a direction that faces the traveling light, and may serve to guide the light to the front side D1 while totally reflecting the light to the front side D1. The travel path of light may be determined depending on the angle $\theta_A$ defined between the reflective surface 130 and the first inclined line 1331. The angle $\theta_B$ defined by the reflective surface 130 and the second inclined line 1332 is an angle that is defined depending on the angle $\theta_A$ defined by the reflective surface 130 and the first inclined line 1331. A height of the second reflective optic 133 may be determined depending on the angle $\theta_A$ defined by the reflective surface 130 and the first inclined line 1331, and as the angle $\theta_A$ defined by the first inclined line 1331 becomes smaller, that is, the height of the second reflective optic 133 becomes larger, the light intensity may become stronger. For example, the sizes of $\theta_A$ and $\theta_B$ may be the same or different.

The light distribution performance and the lighting image uniformity may be appropriately adjusted by adjusting the spacing between the plurality of second reflective optics 133, the height, the inclination angle, and the like of the second reflective optic 133 depending on the design specifications of the lamp 10 for a vehicle.

Referring to FIGS. 4 and 5, the reflective optic part 131 may be formed such that the first reflective optic 132 and the second reflective optic 133 are alternately arranged along the extension direction of the light guide part 100.

In detail, the first reflective optic 132 and the second reflective optic 133 are each provided in plural numbers, and may be disposed alternately along the extension direction of the light guide part 100. That is, the second reflective optics 133 may be disposed between the plurality of first reflective optics 132. In this way, the plurality of the first reflective optics 132 and the plurality of second reflective optics 133 are spaced apart from each other and be alternately disposed along the extension direction, so that the advantages of the first reflective optic 132 and the second reflective optic 133 may be maximized. Accordingly, according to the embodiment of the present disclosure, both the light distribution performance and the lighting image uniformity may be secured.

Meanwhile, FIGS. 6 and 7 illustrate the light guide part 100' according to the second embodiment. The light guide part 100' according to the second embodiment of the present disclosure includes output surface 150', but differs in the disposition of the reflective optic part 131'.

Referring to FIGS. 6 and 7, the reflective optic part 131' according to the second embodiment of the present disclosure may be formed on the reflective surface 130' in a direction that crosses a direction, in which the light guide part 100' extends, in two stages.

Furthermore, when it is assumed that, among the two-stage reflective optic parts 131', one is referred to as the first stage reflective optic part (see area I in FIG. 6), and the other is referred to as the second stage reflective optic part (see area II in FIG. 6), the second reflective optic 133' provided in the second stage reflective optic part 131' may be disposed in a position corresponding to the first reflective optic 132' provided in the first stage reflective optic part 131', and the first reflective optic 132' provided in the second stage reflective optic part 131' may be disposed in a position corresponding to the second reflective optic 133' provided in the first stage reflective optic part 131'.

In detail, the first stage reflective optic part 131' and the second stage reflective optic part 131' be a first group of reflective optic group, in which first reflective optics 132' and second reflective optics 133' are disposed alternately. The first stage reflective optic part 131' and the second stage reflective optic part 131' may be in two stages, and the reflective optic of the first stage reflective optic part 131' and the reflective optic of the second stage reflective optic part 131', which are disposed at corresponding positions may have different shapes. Furthermore, for example, the reflective optic of the first stage reflective optic part 131' and the reflective optic of the second stage reflective optic part 131' may be disposed in a direction that is perpendicular to an extension direction of the reflective surface 130'.

Accordingly, for example, when a direction that faces the second stage reflective optic part 131' from the first stage reflective optic part 131' is referred to as an opposite direction, a second reflective optic 133' of the second stage reflective optic part 131' may be disposed in the opposite direction of 132' of the first reflective optic 132' of the first stage reflective optic part 131'. In addition, the first reflective optics 132' of the second stage reflective optic part 131' may be disposed in the opposite direction of the second reflective optic 133' of the first stage reflective optic part 131'.

However, the disposition of the reflective optic part 131' is not limited thereto, and one group of reflective optics, in which the first reflective optics 132' and the second reflective optics 133' are disposed alternately, may be disposed in three or more multi-stage groups. Meanwhile, FIGS. 6 and 7 illustrate that the first reflective optic 132' and the second reflective optic 133' provided in the reflective optic part 131' are connected to each other.

Meanwhile, FIG. 8 illustrates a modification of the second embodiment of the present disclosure. The modification of the second embodiment of the present disclosure is different from the above-described second embodiment in the disposition of the reflective optic part 131" compared to the second embodiment.

According to the modification of the second embodiment of the present disclosure, the first stage reflective optic part 131" (see area I in FIG. 8) and the second stage reflective optic part 131" (see area II in FIG. 8) may be spaced apart from each other along the reflective surface 130".

Here, in the arrangement of the first stage reflective optic part 131" and the second stage reflective optic part 131", as in the second embodiment described above, the second reflective optic 133" provided in the second stage reflective optic part 131" may be disposed in a position corresponding to the first reflective optic 132" provided in the first stage reflective optic part 131", and the first reflective optic 132" provided in the second stage reflective optic part 131" may be disposed in a position corresponding to the second reflective optic 133" provided in the first stage reflective optic part 131".

In a modification of the second embodiment of the present disclosure, to additionally adjust lengths of the first reflective optic 132" and the second reflective optic 133" in a facing direction, the first stage reflective optic part 131" and the second stage reflective optic part 131" may be disposed to be spaced apart from each other. In detail, in the first stage reflective optic part 131" and the second stage reflective optic part 131", the lengths of the first and second reflective optics 132" and 133" provided in the first stage reflective optic part 131" and the first and second reflective optics 132"

and 133" provided in the second stage reflective optic part 131" in the facing direction may be adjusted depending on a spacing degree.

Accordingly, a light pattern and a light quantity lighting uniformity may be adjusted to suit the design specifications of the lamp 10 for a vehicle.

Furthermore, for example, although not illustrated, the lengths of the plurality of first reflective optics 132" and second reflective optics 133" may be different. In detail, for example, the uniformity of the lighting images may be increased or decreased by increasing or decreasing the length of the first reflective optic 132" that is an arc-shaped optic. Alternatively, a brightness of the lighting image may be increased or decreased by increasing or decreasing the length of the second reflective optic 133" that is an angular optic.

According to the modification of the second embodiment of the present disclosure, the pattern and the brightness of the light may be variously adjusted by adjusting the spacing of the two-stage reflective optic part 131" in in the facing directions, or the length of the first reflective optic 132" or the second reflective optic 133".

Meanwhile, referring to FIGS. 1 to 3 and 9 to 13, the light guide part 100 according to the present disclosure may include at least two or more curved parts. In detail, the guide body 110 may include a first part 110a (see area I in FIGS. 1 to 3), a curved part 110d, and a second part 110b (see area II in FIGS. 1 to 3). This may be applied to all light guide parts 100 according to the first and second embodiments described above.

The first part 110a may be an area that extends toward the front side D1 to be inclined as it goes from one end to an opposite end with respect to the extension direction of the light guide part 100. Furthermore, the curved part 110d may be an area that is connected to the opposite end of the first part 110a. Furthermore, the second part 110b may be an area that extends from the curved part 110d and extends toward the rear side D2 to be inclined as it goes toward the opposite end.

Here, the output surface 150 provided in the curved part 110d may be curved to connect the output surface 150 of the first part 110a and the output surface 150 of the second part 110b. Furthermore, the output surface 150 provided in the curved part 110d may include a plurality of optics 151. The optic 151 may be formed to be concave toward the rear side D2.

In detail, the first part 110a and the second part 110b of the guide body 110 may extend in different directions, and the curved part 110d is a curved part that connects them. Here, the first part 110a may be a part that extends to be inclined toward the front side D1, that is, toward the output direction, as it goes toward the curved part 110d. The second part 110b is a part that extends to be inclined in the opposite direction to the front side D1 as a distance from the curved part 110d increases.

When the light guide part 100 has a part that is curved toward the front side D1 like this, and there may occur a hotspot area, in which light is concentrated or a dark area even when the reflective surface 130 has a reflective optic part 131. Accordingly, the lighting image may not be uniform. In this way, when the light guide part 100 has a free design including a curved part, there may be a limit in securing the uniformity of the lighting image by using only the reflective optic formed on the reflective surface 130. The light guide part 100 according to the embodiment of the present disclosure may solve this problem by forming an additional optic 151 on the output surface 150 of the curved part 110d.

In detail, the optic 151 may be formed on the output surface 150 of the curved part 110d that is curved to be convex toward the front side D1 of the guide body 110, and a plurality of optics 151 may be formed to be spaced apart from each other. For example, the optic 151 may be formed in a concave groove shape on the output surface 150. Furthermore, the plurality of optics 151 may be arranged to be spaced apart from each other along the extension direction of the light guide part 100. However, the shape and the disposition of the optics 151 are not limited to the above.

According to the embodiment of the present disclosure, by additionally providing such an optic 151 on the output surface 150, a hotspot area and a dark zone may be minimized when the lamp 10 for a vehicle is turned on even in the light guide including the curved part whereby a uniform lighting image may be implemented.

Meanwhile, the area, in which the optic 151 is formed, will be described in detail with reference to FIG. 1.

The output surface 150 of the guide body 110 may be formed in a shape that has a partial shape of a cylindrical pipe.

Furthermore, when a radius of curvature of the output surface 150 of the curved part 110d is referred to as a curved part curvature radius on an imaginary plane including a central axis of the first part 110a and a central axis of the second part 110b, and twice the radius of curvature of the output surface 150 is a diameter of the output surface 150 on a cross section that is perpendicular to the central axis of the guide body 110, the curved part curvature radius may be formed to be 1 to 5 times or less the diameter of the output surface 150.

In detail, the first part 110a and the second part 110b may be in the form of pipes that extend in crossing directions. Furthermore, on the imaginary plane including the central axis of the first part 110a and the central axis of the second part 110b, the output surface 150 may have an arc shape that is convex on the front side D1. Then, the radius of curvature of the output surface 150 is defined as curved part curvature radius. Then, the curved part curvature radius is related to an angle defined by the first part 110a and the second part 110b.

Furthermore, it is an arc shape having a curvature of the output surface 150 on the plane that is perpendicular to the above-described imaginary plane, and then, twice the radius of curvature is defined as a diameter of the output surface 150.

Then, when the curved part curvature radius of the output surface 150 is formed to be 1 to 5 times or less the diameter of the output surface 150 or less, photosynthetic optics may be formed on the output surface 150 of the curved part 110d. This is because when the curved part curvature radius is more than 5 times the diameter of the output surface 150, a degree of curvature is not excessive and dark zones and hot spots are less likely to occur. That is, the optic 151 may serve to improve the lighting image by forming the curved portion of the light guide part 100 in an area, in which the degree of curving is excessive.

In detail, the optic 151 may be formed on the output surface 150 to extend in a direction that is perpendicular to the extension direction of the guide body 110, and a plurality of optics 151 are formed along the extension direction of the guide body 110 to be spaced apart from each other.

That is, the optics 151 may be formed to be long in a direction that is perpendicular to the extension direction of the guide body 110. Furthermore, the plurality of optics 151 may be formed to be spaced apart from each other along the extension direction of the guide body 110. Here, the spacing between optics 151, the number of optical optics, and the length of optics 151 may vary depending on the design specifications of the lamp 10 for a vehicle.

Meanwhile, referring to FIGS. 1 to 3, the guide body 110 may include a third part 110c (see area III of FIGS. 1 to 3) that extends from an opposite end of the second part 110b and extends in a direction that is perpendicular to a direction that faces the front side D1. Reference numeral 110e that has not been described is a curved part that connects the second part and the third part.

The reflective optic part 131 provided in the first part 110a may include the first reflective optic 132, and the reflective optic parts 131 provided in the second part 110b and the third part 110c may include a first reflective optic 132 and a second reflective optic 133 that are alternately disposed along the extension direction of the light guide part 100.

In detail, because the first part 110a is formed to be inclined in the direction that faces the front side D1, most of the light that reaches the reflective optic part 131 in an interior of the first part 110a may be totally reflected at an obtuse angle. Accordingly, because the intensity of the light is secured to a certain extent when the lamp is turned on, the reflective optic part 131 of the first part 110a may be formed of the first reflective optic 132 having an arc-shaped groove shape to improve the light uniformity (see FIG. 9).

On the other hand, because the second part 110b extends to be inclined toward the rear side D2 and the third part 110c extends in a direction that is perpendicular to the front side D1, most of the light that reaches the reflective optic part 131 in the interiors of the second part 110b and the third part 110c may be totally reflected at an acute angle. Accordingly, the intensity of the light may be weak when the lamp is turned on. Accordingly, to secure the lighting image uniformity and the light distribution performance, in the reflective optic parts 131 of the second part 110b and the third part 110c, the first reflective optic 132 and the second reflective optic 133 may be alternately disposed (see FIGS. 10 and 11).

FIG. 14 illustrates a lighting image of the lamp 10 for a vehicle according to a comparative example of the present disclosure, and FIG. 15 illustrates a lighting image of the lamp 10 for a vehicle according to an embodiment of the present disclosure.

The comparative example of the present disclosure illustrated in FIG. 14 is a lighting image when the reflective optic part 131 and optic 151 according to the present disclosure are not applied to the light guide including the curved part. As illustrated, light distribution performance is secured, but it may be seen that excessive dark zones (see area "A" of FIG. 14) and hot spots (see area "D" of FIG. 14) occur in respective sections, resulting in a significant decrease in the lighting uniformity (see areas "A", "B", "C", and "D" of FIG. 14).

Referring to the embodiment of the present disclosure illustrated in FIG. 15, it may be seen that the lighting image of the lamp 10 for a vehicle is uniform as a whole while the light distribution performance is secured as illustrated.

According to the present disclosure, by alternately disposing the reflective optics of different shapes on the reflective surface of the light guide part, the light distribution performance may be improved and the uniformity of the lighting image may be maximized.

Although the present disclosure has been described with reference to the embodiments, it will be appreciated by an ordinary skilled in the art, to which the present disclosure pertains, that the present disclosure may be modified and changed within the scope of the appended claims without departing from the spirits and technical field of the present disclosure.

What is claimed is:

1. A lamp for a vehicle, comprising:

a light source part configured to emit light; and a light guide part configured to receive light emitted from the light source part and to guide and output the light received from the light source part from a front side of the light guide part, wherein the light guide part includes:

a guide body including an input surface disposed at a first end of the guide body in an extension direction of the light guide part and to which the light emitted from the light source part is input;

a reflective surface formed on a rear surface of the guide body, and having a reflective optic part configured to reflect the light input through the input surface to the front side of the light guide part; and an output surface configured to output the light to an outer surface of the guide body, wherein the reflective optic part includes:

a plurality of first reflective optics configured to reflect at least a portion of the input light to the front side of the light guide part; and second reflective optics configured to reflect at least a portion of the input light to the front side of the light guide part, formed in a different shape from that of the first reflective optics, and disposed between the plurality of first reflective optics, and wherein the guide body includes:

a first part extending to be inclined to the front side of the light guide part as it extends with respect to the extension direction of the light guide part;

a curved part connected to an end of the first part; and a second part extending from the curved part, and extending to be inclined to a rear side of the light guide part, which is opposite the front side of the light guide part.

2. The lamp of claim 1, wherein each of the first reflective optics and the second reflective optics is concave toward the front side of the light guide part on the reflective surface, and extends in a direction perpendicular to the extension direction of the light guide part, wherein a cross-sectional shape of the first reflective optic in a direction perpendicular to an extension direction of the first reflective optic is a partial shape of a circle, and wherein a cross-sectional shape of the second reflective optic in an extension direction of the second reflective optic is a shape including a first inclined line and a second inclined line crossing the first inclined line at a front end thereof.

3. The lamp of claim 2, wherein an angle defined by the reflective surface and the first inclined line and an angle defined by the reflective surface and the second inclined line are different.

4. The lamp of claim 1, wherein the reflective optic part is configured such that the first reflective optics and the second reflective optics are alternately disposed along the extension direction of the light guide part.

5. The lamp of claim 4, wherein the reflective optic part is formed on the reflective surface in two stages in a direction crossing the extension direction of the light guide part, and wherein when any one of the reflective optic part in the two stages is a first stage reflective optic part and the other thereof is a second stage reflective optic part, the second reflective optic in the second stage reflective optic part is disposed at a location corresponding to the first reflective optic in the first stage reflective optic part, and the first reflective optic in the second stage reflective optic part is disposed at a location corresponding to the second reflective optic in the first stage reflective optic part.

6. The lamp of claim 5, wherein the first stage reflective optic part and the second stage reflective optic part are spaced apart from each other.

7. The lamp of claim 1, wherein the curved part includes a plurality of optics formed to be concave toward the rear side of the light guide part.

8. The lamp of claim 7, wherein the output surface of the light guide part has a partial shape of a cylindrical pipe, wherein when, on an imaginary plane including a central axis of the first part and a central axis of the second part, a radius of curvature of the curved part is defined as a curved part curvature radius, when, on a cross-section in a direction perpendicular to a central axis of the guide body, twice of the radius of curvature of the output surface is a diameter of an output surface, and a value of the curved part curvature radius is less than five times a value of the diameter of the output surface.

9. The lamp of claim 7, wherein the reflective optic part is disposed on the output surface to extend in a direction perpendicular to an extension direction of the guide body, and wherein the first and second reflective optics are spaced apart from each other along the extension direction of the guide body.

10. The lamp of claim 7, wherein the guide body further includes:

a third part extending from the second part, and extending in a direction perpendicular to a direction facing the front side of the light guide part, wherein the reflective optic part disposed in the first part includes the first reflective optics, and wherein the reflective optic parts disposed in the second part and the third part, respectively, include the first reflective optics and the second reflective optics alternately disposed along the extension direction of the light guide part.

* * * * *